United States Patent
Runge et al.

(10) Patent No.: US 7,246,061 B2
(45) Date of Patent: Jul. 17, 2007

(54) METHOD FOR THE VOICE-OPERATED IDENTIFICATION OF THE USER OF A TELECOMMUNICATIONS LINE IN A TELECOMMUNICATIONS NETWORK IN THE COURSE OF A DIALOG WITH A VOICE-OPERATED DIALOG SYSTEM

(75) Inventors: Fred Runge, Wuensdorf (DE); Christel Mueller, Schulzendorf (DE); Marian Trinkel, Kreuzau OT Untermaubach (DE); Thomas Ziem, Zepernick (DE)

(73) Assignee: Deutsche Telekom AG, Bonn (DE)

( * ) Notice: Subject to any disclaimer, the term of this patent is extended or adjusted under 35 U.S.C. 154(b) by 842 days.

(21) Appl. No.: 10/181,153

(22) PCT Filed: Dec. 15, 2000

(86) PCT No.: PCT/EP00/12850

§ 371 (c)(1),
(2), (4) Date: Oct. 7, 2002

(87) PCT Pub. No.: WO01/50455

PCT Pub. Date: Jul. 12, 2001

(65) Prior Publication Data

US 2003/0110034 A1    Jun. 12, 2003

(30) Foreign Application Priority Data

Jan. 6, 2000    (DE)    ................................ 100 00 973

(51) Int. Cl.
 G10L 21/00    (2006.01)
 H04M 1/65    (2006.01)

(52) U.S. Cl. ...................... 704/239; 704/201; 704/270; 379/67.1; 379/88.02

(58) Field of Classification Search ........ 704/270–275, 704/251, 231, 239, 201; 379/88.01, 88.02, 379/189, 88.03, 67.1, 199; 455/411, 563
See application file for complete search history.

(56) References Cited

U.S. PATENT DOCUMENTS

| 4,837,804 A | 6/1989 | Akita |
| 5,365,574 A | 11/1994 | Hunt et al. |

(Continued)

FOREIGN PATENT DOCUMENTS

| DE | 19841166 A | 3/2000 |

(Continued)

Primary Examiner—Vijay Chawan
(74) Attorney, Agent, or Firm—Kenyon & Kenyon LLP

(57) ABSTRACT

A method for the voice-operated identification of the user of a telecommunications line in a telecommunications network is provided in the course of a dialog with a voice-operated dialog system. Utterances spoken by a caller from a group of callers limited to one telecommunications line are used during a human-to-human and/or human-to-machine dialog to apply a reference pattern for the caller. For each reference pattern, a user identifier is stored which is activated once the caller is identified, and, together with the CLI and/or ANI identifier of the telecommunications line, are made available to a server having a voice-controlled dialog system. On the basis of the CLI, including the user identifier, data previously stored for this user are ascertained by the system and made available for the dialog interface with the customer.

4 Claims, 1 Drawing Sheet

U.S. PATENT DOCUMENTS

| | | | |
|---|---|---|---|
| 5,414,755 A * | 5/1995 | Bahler et al. | 379/88.02 |
| 5,608,784 A | 3/1997 | Miller | |
| 5,666,405 A | 9/1997 | Weber | |
| 5,913,196 A * | 6/1999 | Talmor et al. | 704/270 |
| 5,960,392 A | 9/1999 | Sundberg et al. | |
| 6,510,415 B1 * | 1/2003 | Talmor et al. | 704/273 |
| 6,539,352 B1 * | 3/2003 | Sharma et al. | 704/249 |

FOREIGN PATENT DOCUMENTS

| | | |
|---|---|---|
| EP | 0892388 | 1/1999 |
| WO | WO 98/16906 A | 4/1998 |
| WO | WO99/45690 | 9/1999 |

* cited by examiner

METHOD FOR THE VOICE-OPERATED IDENTIFICATION OF THE USER OF A TELECOMMUNICATIONS LINE IN A TELECOMMUNICATIONS NETWORK IN THE COURSE OF A DIALOG WITH A VOICE-OPERATED DIALOG SYSTEM

FIELD OF INVENTION

The present invention is directed to the voice-operated identification of a user of a telecommunications line from a limited user group.

BACKGROUND INFORMATION

A telecommunications line may be identified via the CLI (calling line identification) or ANI (automatic number identification) which is transmitted over various telecommunications networks. Individual users, for example, a plurality of users of one telecommunications line, are able to be differentiated based on the query for a personal identifier, such as a PIN. The PIN is a personal secret number employed by the user to verify his or her identity to the system.

Voice-processing systems may be used for controlling switching equipment, computers or telecommunications lines.

In the context of voice-recognition systems, it is the content of the spoken utterance that is recognized. Speaker-dependent voice-recognition systems (including speaker-verification systems, speaker-identification systems, speaker-classification systems) are oriented to recognizing characteristic voice features. The speaker-dependent voice-recognition system recognizes a person on the basis of characteristic voice features of the spoken utterance. In many respects, speaker-recognition resembles voice-recognition, so that for many types of applications, it may be evident to combine both functions in one unit.

Voice-recognition algorithms are available which are able to recognize a relatively large number of words in real time. These algorithms employ theoretical probability formulations and exhibit some advantages over conventional pattern-recognition algorithms. In the context of this algorithm, a plurality of patterns per word, a special form of pattern adaptation and of the strategy for calculating spacing facilitate the implementation of word recognition for a limited circle of people. The operation of the above algorithm may be explained on the basis of three logic functions: pre-processing the voice signal (deriving the pattern from the voice signal); training (producing the reference pattern); and recognition (theoretical probability calculation). If algorithms of this kind are used for the voice-controlled operation of, for example, the functions of a telecommunications line, the problem arises of identifying the specific users of the limited circle of people. This can likewise be accomplished as a voice-controlled operation, for example, by recognizing the content of a spoken numeric string (password, PIN) and comparing it to a numeric string (password, PIN) in a database assigned to the speaker.

The drawback of such approaches is that, when communicating interactively with a voice-operated dialog system, the user must identify himself/herself to the dialog system either by his/her PIN, or must undergo a training process for the voice recognition. In the process, the user is asked to enter previously trained instruction words. Not until completing this task is the user able to take advantage of the services of the voice-operated dialog system selected by him/her. The procedure requested by the customer for identifying himself/herself to the system may vary from dialog system to dialog system.

DETAILED DESCRIPTION

Figure 1:
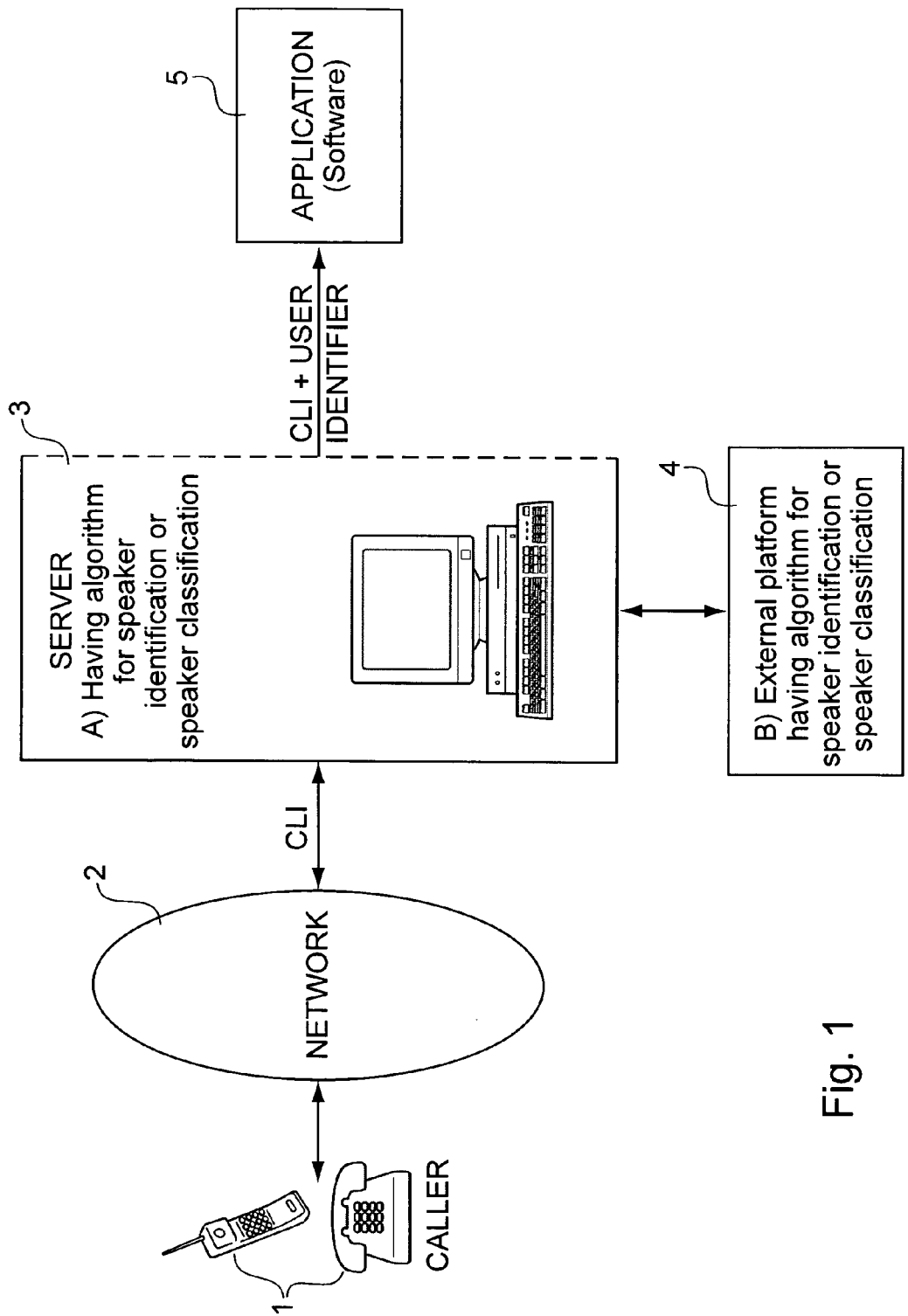
FIG. 1 shows an example system according to an embodiment of the present invention.

Embodiments of the present invention avoid the time needed to identify a speaker/caller from a limited speaker group assigned to one telecommunications line. In this context, the speaker/caller is identified under the known speaker-identification and/or text-independent speaker verification principle, without the user having to run through a procedure similar to the above method to identify himself/herself each time he/she calls the dialog system.

In embodiments of the present invention, as in FIG. 1, once a connection by a caller 1 is established via the telecommunications network 2, the caller's telecommunications line is first identified on the basis of the line identification, for example, via the CLI or ANI identification. Utterances spoken during a greeting dialog between the user of the telecommunications line identified on the basis of the CLI or ANI identification and his/her conversation partner, for example, by a voice-operated dialog system, are recorded and made available in digitized form to a server. The caller's spoken utterances existing in digitized form are fed from the server to a speaker-recognition module assigned to the server for further processing 3. In the speaker-recognition module, the spoken utterances are compared to the reference patterns of the circle of people who have verified their identity for this telecommunications line which are previously stored for the identified telecommunications line. This operation takes place in the background, without the customer who is placing the call perceiving it at a conscious level. If, following the comparison with the reference patterns previously stored for this telecommunications line during previous calls, a similarity to one of these stored reference patterns is ascertained within certain limits, indicating that a reference pattern already exists for the caller in question, then an identifier that is stored for the reference pattern and, thus, for the identified caller is activated and added to the CLI and/or ANI identification. Using the thus expanded CLI and/or ANI identification, the dialog system is not only able to recognize the caller's call number, but also uniquely identify the specific caller. It is, thus, possible for the customer to be personally addressed by the dialog system, and/or for the dialog system to access the personal user profile created for this customer on the basis of previous sessions in order to quickly fulfill the customer's wishes 5.

In further embodiments, if it is ascertained after evaluating the caller's voice pattern that there is still no line-specific reference pattern for this caller, then a voice pattern of the new user may be used to apply a further reference pattern for the telecommunications line in question, and/or the user is asked to enter specific word strings. If uncertainties arise in the context of the new user once more placing a call, then a follow-up training may be needed, i.e., the user is once again requested to enter specific word strings. These word strings are compared to the previously stored reference patterns. The caller is queried by the system as to his/her identity. When the user confirms the identity presumed by the system, this confirmation utterance is added to the already existing reference pattern. In cases where speaker classification algorithms 4 are used (age, sex differentiation on the basis of spoken utterances), the reference patterns may be preconfigured by the manufacturer of the system.

Since the speaker selection is made from a user group that is known to the system, but is limited, a high level of security with respect to identification or classification is assured.

Embodiments of the present invention may be used in the context of individualizing human-machine dialog structures; for differentiating the speakers during an audio conference including a corresponding display; for rendering the accounts of the users of a telephone line; and/or for presenting specific customer data for an operator service.

Depending on the communications terminals available to the customer, within the scope of the present invention, besides the speaker identification and/or speaker classification on the basis of spoken utterances by the speaker, other methods are possible for identifying the caller, such as, for example, identifying the caller on the basis of fingerprints, face, eyes, handwriting, shape of the hand, and handprints, or on the basis of a keyboard-operation profile. The prerequisites, however, are always appropriately configured communications terminals at the customer's site, and the corresponding identification systems at the service providers' systems.

What is claimed is:

1. A method for the voice-operated identification of a user of a telecommunications line in a telecommunications network during a dialog with a voice-operated dialog system, comprising:

establishing a telecommunications connection via the telecommunications network;

identifying the telecommunications line on the basis of its line identification, including:

recording utterances spoken by the user during at least one of a human-to-human dialog and a human-to-machine dialog via a module for at least one of speaker-identification speaker verification, text-independent speaker verification, and speaker classification;

comparing the utterances with reference patterns previously stored in the module for the telecommunications line, so that:

when a similarity between the utterances spoken by the user and at least one of the previously stored reference patterns is ascertained, then activating a user identifier stored for the ascertained reference pattern making it possible for the user to be uniquely identified; and when a similarity between the utterances spoken by the user and at least one of the previously stored references is not ascertained, then generating a new reference pattern and a new user identifier associated with the user, and storing the new reference pattern in the module for the telecommunications line;

expanding the line identification identifier of the telecommunications line of the user placing a call to include the associated user identifier of the user identified; and during a dialog between the user and the voice-controlled dialog system, upon identification of the user, making available the line identification of the telecommunications line and the user identifier of the user placing the call to a server having a voice-controlled dialog system;

ascertaining data previously stored for the user placing the call on the basis of line identification and the user identifier, and making available the data previously stored for the dialog interface so that, based on the known data pertaining to the customer, an individual user is promptable.

2. The method of claim 1, further comprising:

assigning each user of a telecommunications line a numerical code as a user identifier.

3. The method of claim 1, wherein the identifying the telecommunications line on the basis of its line identification occurs via one of calling line identification and automatic number identification.

4. The method of claim 1, wherein the prompting of the individual user involves personally addressing the user.

* * * * *